(12) United States Patent
Briddell et al.

(10) Patent No.: US 10,899,564 B2
(45) Date of Patent: Jan. 26, 2021

(54) DESTACKING CONVEYOR

(71) Applicant: Laitram, L.L.C., Harahan, LA (US)

(72) Inventors: Dane Briddell, Silver Spring, MD (US); Matthew L. Fourney, Laurel, MD (US); Mark Costanzo, River Ridge, LA (US); Leonard J. Reynolds, Jr., Harahan, LA (US); Eric Leefe, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 16/629,133

(22) PCT Filed: Jun. 25, 2018

(86) PCT No.: PCT/US2018/039328
§ 371 (c)(1),
(2) Date: Jan. 7, 2020

(87) PCT Pub. No.: WO2019/013963
PCT Pub. Date: Jan. 17, 2019

(65) Prior Publication Data
US 2020/0290824 A1     Sep. 17, 2020

Related U.S. Application Data

(60) Provisional application No. 62/532,700, filed on Jul. 14, 2017.

(51) Int. Cl.
*B65G 59/06* (2006.01)
*B65G 59/12* (2006.01)
(Continued)

(52) U.S. Cl.
CPC ........ *B65G 59/067* (2013.01); *B65G 17/345* (2013.01); *B65G 47/256* (2013.01); *B65G 47/82* (2013.01); *B65G 47/8815* (2013.01); *B65G 59/12* (2013.01); *B65G 2203/0283* (2013.01); *B65G 2203/044* (2013.01)

(58) Field of Classification Search
CPC ..... B65G 59/12; B65G 59/067; B65G 59/068
See application file for complete search history.

(56) References Cited

U.S. PATENT DOCUMENTS 3,993,187 A    11/1976  Knez
7,344,018 B2 *  3/2008  Costanzo ............... B65G 17/24
                                                    198/779

(Continued)

FOREIGN PATENT DOCUMENTS

FR    2832654 B1    2/2004
JP    10-029720 A   2/1998

*Primary Examiner* — William R Harp
(74) *Attorney, Agent, or Firm* — James T. Cronvich (57) ABSTRACT

A destacking conveyor having a conveyor belt with pushers selectively pushing stacked packages transverse to the conveying direction to one side of the conveyor against a vertical wall with a gap between the bottom of the wall and the belt to block the top package of a stack and allow the bottom package to pass through the gap and off the side of the belt to a reject bin. In another version a destacking conveyor uses a force applicator to apply a downward force against the top of a stack to hold the top package while the pushers slide the bottom package from under the top package.

22 Claims, 9 Drawing Sheets

(51) Int. Cl.
    *B65G 17/34*   (2006.01)
    *B65G 47/256*  (2006.01)
    *B65G 47/82*   (2006.01)
    *B65G 47/88*   (2006.01)

(56) References Cited

U.S. PATENT DOCUMENTS

| | | |
|---|---|---|
| 8,528,742 B2 | 9/2013 | Wargo et al. |
| 2011/0022221 A1 | 1/2011 | Fourney |
| 2012/0261234 A1 | 10/2012 | Schiesser et al. |
| 2018/0029805 A1 | 2/2018 | Ragan |

* cited by examiner

DESTACKING CONVEYOR

BACKGROUND

The invention relates generally to power-driven conveyors and in particular to diverting belt conveyors with blocking walls to destack stacked packages.

Singulating conveyors separate a mass supply of packages into a single file of spaced apart packages so that they can be processed individually. But many singulators cannot separate packages in a stack.

SUMMARY

One version of a destacking conveyor embodying features of the invention comprises a conveyor frame that extends in length from an upstream end to a downstream end and laterally between two opposite sides and a conveyor belt advancing in a conveying direction along a length of the conveyor frame. The belt has pushers that push packages in a transverse direction toward one or the other side of the conveyor frame. A vertical wall has a bottom that extends in the conveying direction above the conveyor belt and forms a gap between the conveyor belt and the bottom of the vertical wall. A series of actuation zones are disposed along the length of the conveyor frame and include actuators to selectively actuate the pushers as they advance through the actuation zones. A package detector disposed upstream of the actuation zones send a detector signal indicating the passage of a stack of packages to the actuators to sequentially actuate the actuation zones, which actuate the pushers as they advance through the actuated actuation zones to push the stack in the transverse direction against the vertical wall as the stack advances in the conveying direction. In that way the top package of the stack is restrained by the vertical wall as the pushers push the bottom package under the vertical wall through the gap to separate the top and bottom packages as they advance in the conveying direction.

Another version of a destacking conveyor comprises a conveyor frame that extends in length from an upstream end to a downstream end and laterally between two opposite sides and a conveyor belt advancing in a conveying direction along a length of the conveyor frame and having pushers that push packages in a transverse direction toward one or the other side of the conveyor frame. A vertical wall has a liftable segment extending in the conveying direction above the conveyor belt. A wall actuator is coupled to the liftable segment to raise it to a raised position forming a gap between the conveyor belt and the bottom of the liftable segment and to lower it to a lowered position dosing the gap enough to prevent packages from passing through the gap. A package detector disposed upstream of the liftable segment sends a detector signal indicating the passage of a stack of packages to the wall actuator to raise the liftable segment to the raised position so that the top package of the stack is restrained by the vertical wall as the pushers push the bottom package under the vertical wall through the gap to separate the top and bottom packages as they advance in the conveying direction.

DETAILED DESCRIPTION

Figure 1:
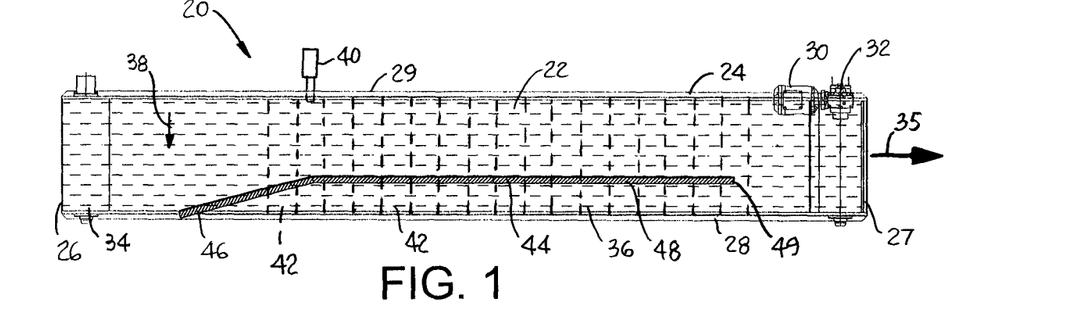
FIG. 1 is a top plan view of one version of a destacking conveyor embodying features of the invention.

One version of a destacking conveyor embodying features of the invention is shown in FIG. 1. The destacking conveyor 20 comprises a conveyor belt 22 mounted in a conveyor frame 24. The frame 24 extends in length from an upstream end 26 to a downstream end 27 and laterally from a first side 28 to an opposite second side 29. The conveyor belt 22 is trained around drive sprockets on a drive shaft driven by a motor 30 through a gear train 32 at the downstream end 27 and an idle shaft and sprockets 34 at the upstream end 26. The motor 30 drives the belt in a conveying direction 35.

The conveyor belt has a plurality of rollers (indicated by their axles 36) that are actuatable to rotate either axles in a transverse direction 38 perpendicular to the conveying direction 35. The rollers, when actuated, act as pushers that push packages atop the rollers toward the first side 28 of the conveyor frame 24. The rollers, or pushers, are actuated by actuators 40 in a series of actuation zones 42 along all or part of the length of the conveyor 20. For a conveyor belt 20 with transverse rollers, each actuation zone 42 would include an array of oblique actuating rollers beneath the upper carryway run of the belt. The actuator 40 for each zone 42 selectively raises and lowers the array of actuating rollers into and out of contact with the transverse belt rollers, which protrude through the belt's thickness past its bottom and top sides. The belt rollers rotate on the raised oblique actuating rollers as the belt 22 advances in the conveying direction 35 to push conveyed packages in the transverse direction 38. The series of actuation zones 42 are sequentially actuated to actuate the belt rollers as they pass through the zones. One version of such a roller conveyor belt and oblique-roller actuator is disclosed in U.S. Pat. No. 7,506,751, issued Mar. 24, 2009, to Matthew L. Fourney. The disclosure of that patent is incorporated into this description by reference.

A vertical wall 44 is suspended above the conveyor belt 22 by a wall support structure (not shown). The wall 44 extends from an upstream wall segment 46 that extends obliquely from the first side 28 of the conveyor inward and downstream to connect to a larger wall segment 48 that extends generally in the conveying direction 35 to a distal end 49. The larger wall segment 48 is spaced apart from the first side 28 of the conveyor 22 at least far enough to provide room on the belt 22 between the wall and the first side of the conveyor for packages that pass under the wall.

Figure 2:
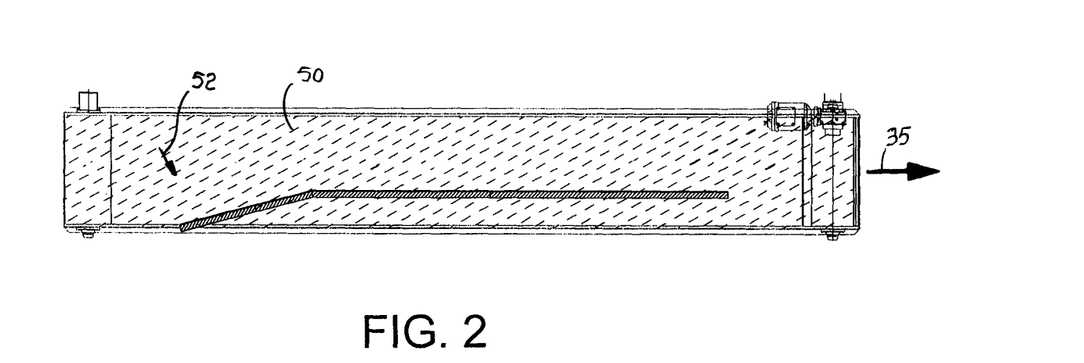
FIG. 2 is a top plan view of destacking conveyor as in FIG. 1 with oblique rollers.

FIG. 2 shows a destacking conveyor as in FIG. 1, but with a conveyor belt having oblique rollers as pushers. The oblique rollers are actuated to rotate on axles 50 to push packages in a transverse direction 52 forward and oblique to the conveying direction 35. The actuation zones in this version are realized as flat bearing surfaces that are selectively moved into and out of contact with the oblique rollers by the actuators. Or the actuation zones can include actuating rollers that rotate freely on axes parallel to the conveying direction to provide a rolling rather than a sliding bearing surface to the oblique belt rollers. One version of such an oblique-roller conveyor belt and longitudinal-roller actuation zone is disclosed in U.S. Pat. No. 6,968,941, issued Nov. 29, 2005, to Matthew L. Fourney. The disclosure of that patent is incorporated into this description by reference.

Other examples of pushers and actuators that could be used in a destacking conveyor like that of FIGS. 1 and 2 include: (a) ferrous or electrically conductive rollers as pushers actuated by permanent magnets, electromagnets, or linear stators; (b) shoe sorters as pushers actuated electromagnetically, by motors, or by guide tracks below the carryway; and (c) cross belts as pushers that ride packages laterally across the belt.

Figure 3:
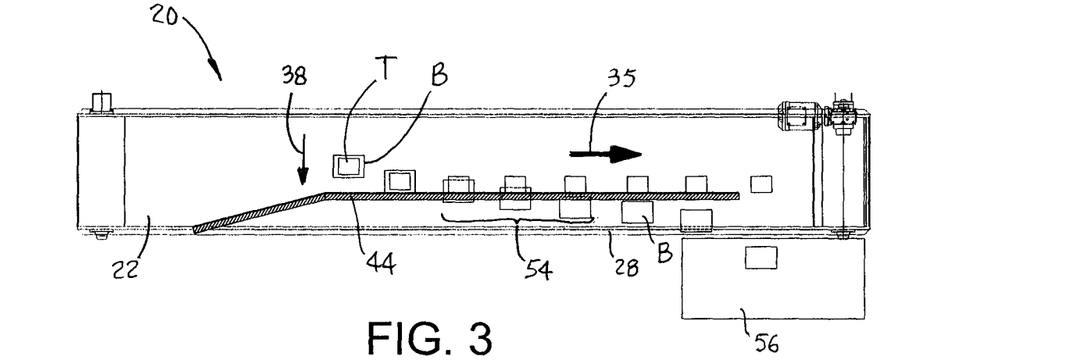
FIG. 3 is a top plan view of a destacking conveyor as in FIG. 1 or FIG. 2 showing the destacking sequence.

The destacking of a pair of stacked packages is illustrated in FIG. 3, which depicts the separation of a top package T from a bottom package B. Actuation zones are sequentially actuated upstream to downstream to push the stacked packages in a transverse direction 38 as the belt 22 conveys the packages in the conveying direction 35. The vertical wall 44 is suspended above the belt 22 across a gap (not shown in FIG. 3, but described later in more detail) sized large enough to allow the bottom package B to pass through, but small enough not to allow the top package T sitting on the bottom package to pass. Once the top package T contacts the vertical wall 44, the pushers in the belt push the bottom package B through the gap and toward the first side 28 of the conveyor, as indicated by the intermediate positions 54 of the packages. After the bottom package B passes through the gap in the wall 44, it continues to be pushed by the pushers in the transverse direction 38 until it is pushed off the side 28 into a reject bin 56 for manual handling or to a return conveyor returning the rejected bottom package back upstream to run through the system again. In the meantime the top package T contacts the pushers, which register it against the vertical wall 44 in proper position for further processing downstream.

Figure 4A:
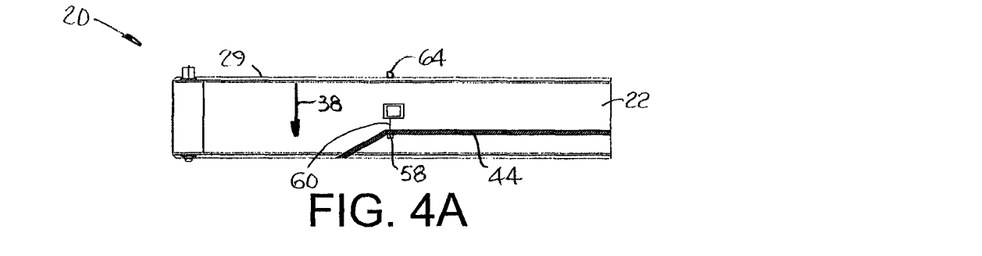
FIGS. 4A and 4B are top plan and side elevation views of a destacking conveyor as in FIG. 3 with a static blocking wall and a package stack passing a package detector.
Figure 4B:
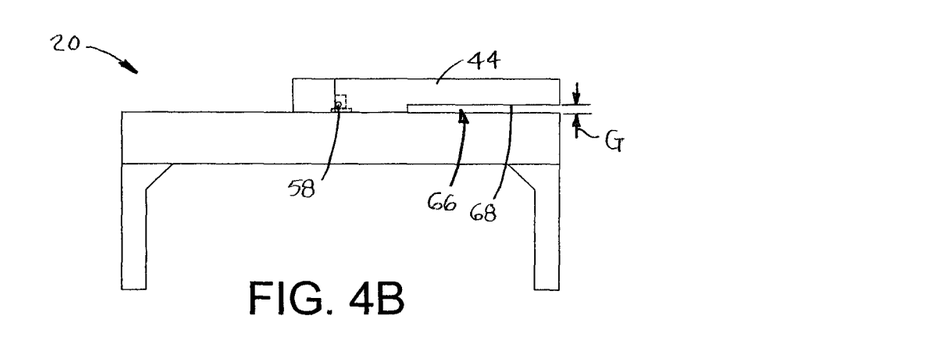
Figure 5A:
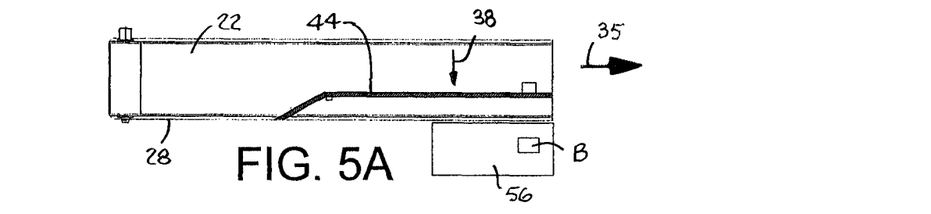
FIGS. 5A and 5B are top plan and side elevation views as in FIGS. 4A and 4B illustrating the diversion of the bottom package of a stack to a reject bin.
Figure 5B:
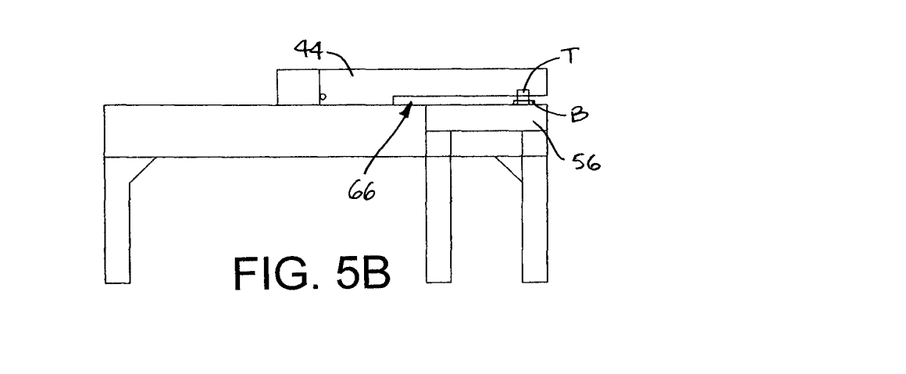

As shown in FIGS. 4A and 4B, the destacking conveyor 20 of FIG. 3 has a package detector 58 shown mounted in the vertical wall 44. The package detector may be a photoelectric eye with a transmitter that transmits an infrared beam 60 laterally across the conveyor belt 22. In one version of photo eye, the beam is reflected back to a receiver co-located with the transmitter in the wall 44. In another version the beam is occluded by the passage of a package stack 62 from being received by a receiver 64 on the second side 29 of the conveyor 20. Once a package stack is detected by the package detector 58, the actuation zones are sequentially actuated to actuate the belt pushers to push the stack toward the vertical wall 44 and deactuated as the stack proceeds downstream. A gap 66 under the bottom 68 of a downstream portion of the static wall 44 has a gap width G that is generally equal to the height of the photo-eye beam 60 above the belt 22. The actuation zones sequentially actuate the pushers in the belt 22 to push the stack towards the first side 28 in the transverse direction 38 as the stack is conveyed atop the belt 22 in the conveying direction 35. The sequencing of the actuation zones is determined from the times of the stack's passing the photo eye 68, the length of the stack as derived from the photo-eye output, and the belt speed in the conveying direction 35. Eventually the bottom package B passes through the gap 66 and is diverted by the pushers into the reject bin 56 as shown in FIGS. 5A and 5B.

Figure 6A:
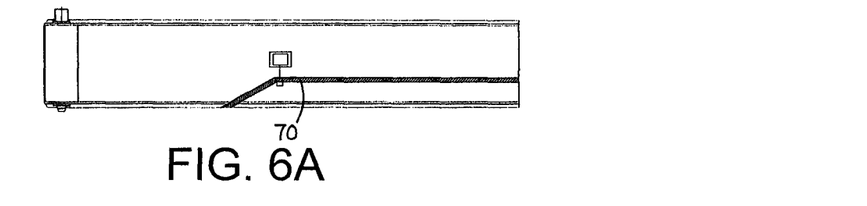
FIGS. 6A and 6B are top plan and side elevation views of a destacking conveyor as in FIG. 3 with a liftable wall segment and a package stack passing a package detector.
Figure 6B:
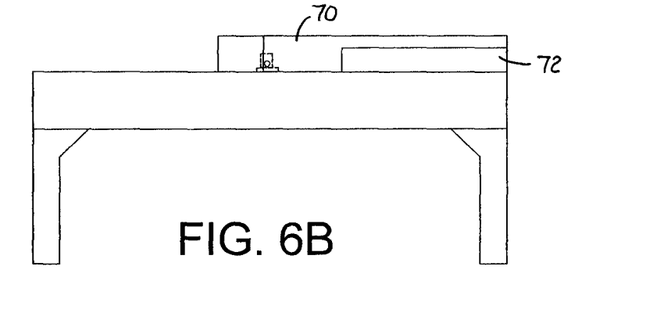
Figure 7A:
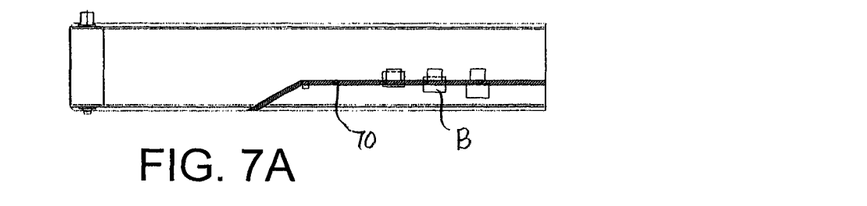
FIGS. 7A and 7B are top plan and side elevation views as in FIGS. 6A and 6B illustrating the sequence of destacking the stacked packages.
Figure 7B:
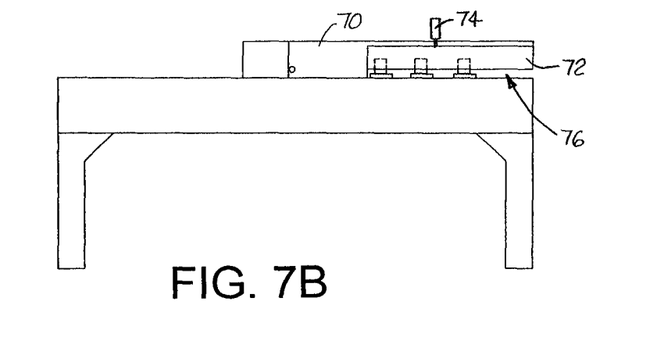
Figure 8A:
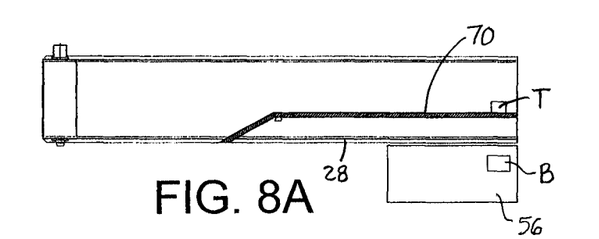
FIGS. 8A and 8B are top plan and side elevation views as in FIGS. 7A and 7B after destacking.
Figure 8B:
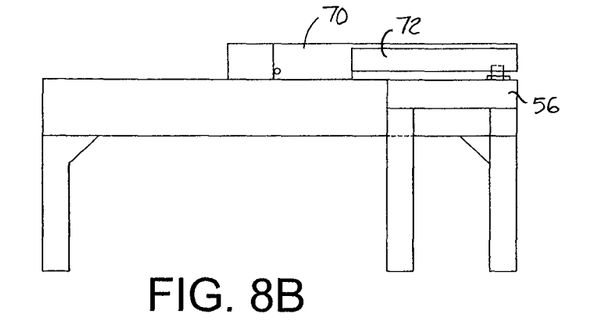

The vertical wall 70 in the conveyor of FIGS. 6A and 6B has a liftable segment 72 at its downstream end. A wall actuator 74, shown in FIG. 7B, raises the liftable segment 72 to a raised position when the stack reaches that segment. The raised segment 72 forms a gap 76 for the bottom package B to pass through while the top package T is blocked by and registered against the vertical wall 70 above the gap. After the stack is separated, the actuator lowers the liftable wall segment 72 to the lowered position shown in FIG. 6B. FIGS. 7A and 7B show the bottom package B passing through the gap 76. After passing through the gap 76, the bottom package B is diverted by the pushers off the first side 28 of the conveyor into a reject bin 56. In the meantime the blocked top package T, as it is cleared by the bottom package B, contacts the pushers and is registered against the wall 70.

Figure 9:
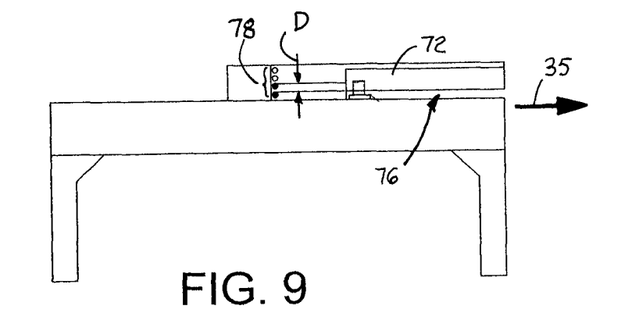
FIG. 9 is a side elevation view of a destacking conveyor as in FIG. 3 with a vertical array of package detectors.

An alternative package detector 78 is shown in FIG. 9. The package detector is realized as a vertical array of photo eyes, such as a light curtain, directing parallel beams across the conveyor belt perpendicular to the conveying direction 35. The vertical array enables the package detector to detect the height of a passing package stack. When a stack passes the vertical array, the liftable wall segment 72 is raised to a height that is a predetermined range D below the level of the highest photo eye in the array detecting a package stack. Thus, the liftable segment 72 provides an adjustable gap 76.

Figure 10A:
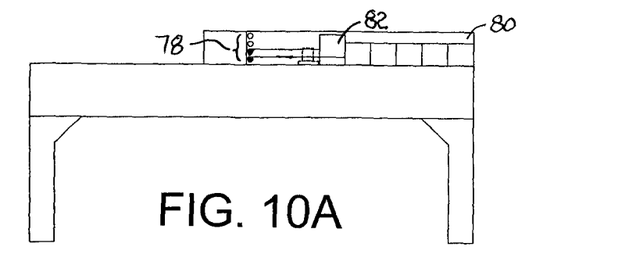
FIGS. 10A-10E are side elevation views of a destacking conveyor as in FIG. 3 with a series of liftable wall segments and a vertical array of package detectors showing the unstacking sequence.
Figure 10B:
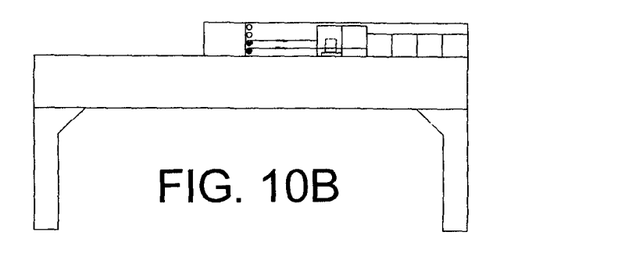
Figure 10C:
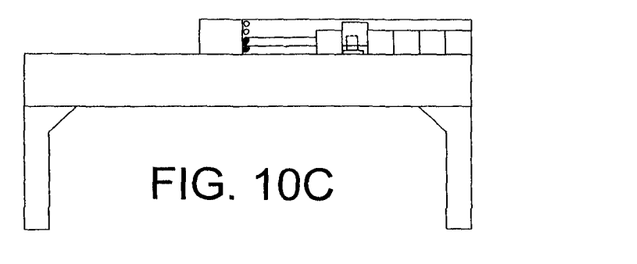
Figure 10D:
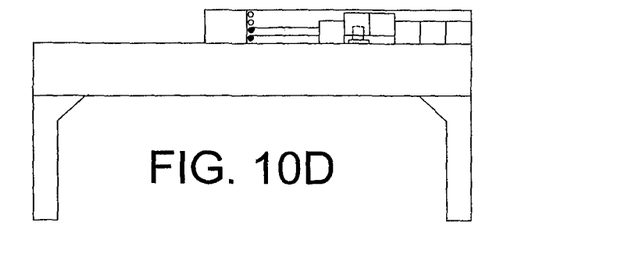
Figure 10E:
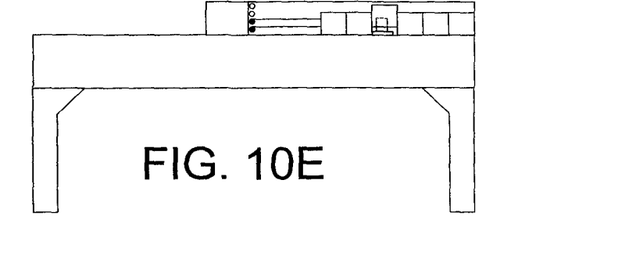

FIGS. 10A-E show a sequence of steps taken to destack a package stack with a vertical wall 80 having a series of liftable wall segments 82. Each wall segment 82 has an associated wall actuator (not shown in FIGS. 10A-10E), such as a linear actuator as in FIG. 7B. Based on belt speed, stack length, and the time the stack passed the package detector 78, the wall actuators raise the liftable wall segments 82 in sequence. The first segment 82 is raised in FIG. 10A. Then the second segment is raised so that two adjacent segments are both in the raised position in FIG. 10B. Then the first is lowered as shown in FIG. 10C. The third segment is raised as shown in FIG. 10D, then the second is dosed as in FIG. 10E. Opening small lengths of the vertical wall 70 at a time allows a much closer spacing of consecutive packages on the conveyor belt and consequently a higher throughput.

Figure 11:
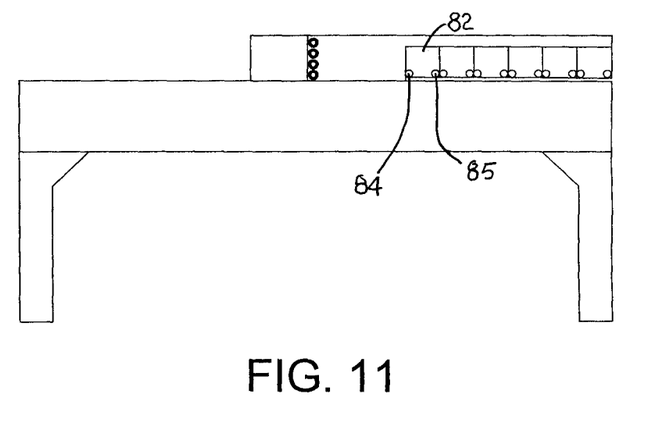
FIG. 11 is a side elevation view of a destacking conveyor as in FIGS. 10A-10E with additional package detectors on the liftable wall segments.

The liftable wall segments 82 are shown in FIG. 11 with photo eyes 84, 85 at upstream and downstream ends. If either photo eye detects a package in the gap, lowering of that wall segment 82 is inhibited until the package dears the gap.

Figure 12A:
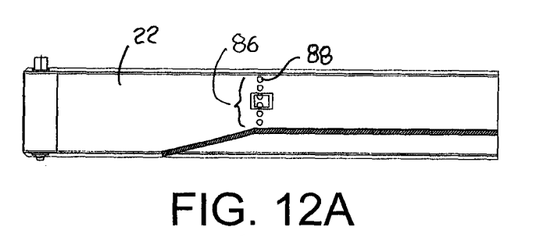
FIGS. 12A and 12B are top plan and side elevation views of a destacking conveyor as in FIG. 3 with a horizontal array of package detectors above the conveyor.
Figure 12B:
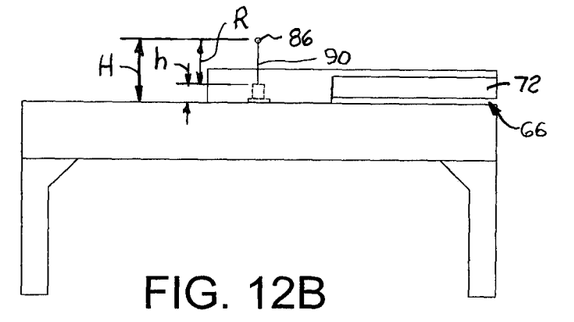

The destacking conveyor of FIGS. 12A and 12B is shown with a package detector 86 formed by a horizontal array of range finders 88 spaced apart laterally above the conveyor belt 22. The range finders 88 direct parallel beams 90 perpendicular to the plane of the belt 22 on the carryway. From the known height H of the range finder above the belt, the height h of the stack can be calculated as h=H−R, where R is the range finder's range reading. The height h can then be used to raise the liftable wall segment to the raised position with a proper gap 66 for the stack height.

Figure 13A:
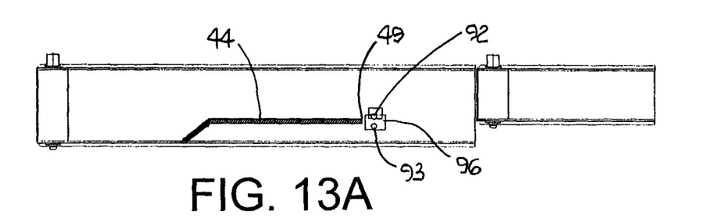
FIGS. 13A and 13B are top plan and side elevation views of a destacking conveyor as in FIG. 3 with detectors for detecting packages stuck under the wall.
Figure 13B:
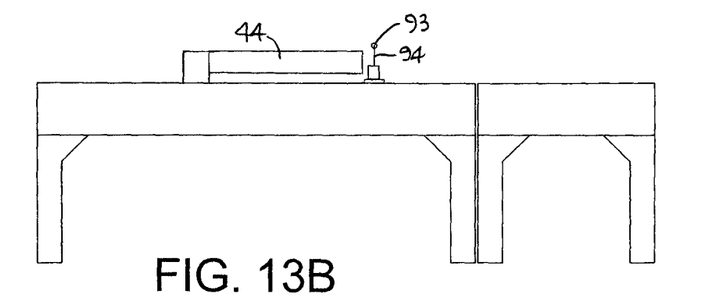
Figure 14A:
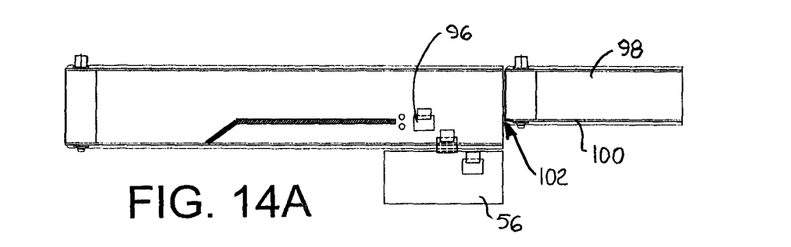
FIGS. 14 and 14B are top pan and side elevation views as in FIGS. 13A and 13B showing the sequence of rejecting the stuck packages.
Figure 14B:
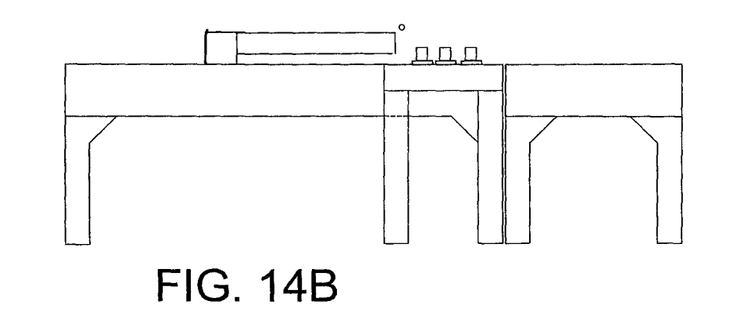

It is possible for some bottom packages to fail to pass through the gap. A polybag, which is flexible and whose shape can change as its contents shift, is especially susceptible to getting caught in the gap. FIGS. 13A and 13B show a pair of package detectors 92, 93 above the conveyor belt 22 on opposite sides of the vertical wall 44 just downstream of its distal downstream end 49. (The detectors 92, 93 may be realized as range finders positioned above the belt 22 directing beams 94 downward dose to the sides of the vertical wall 44.) If both package detectors 92, 93 detect a package at the same time, the undestacked package 96 is diverted off the belt 22 by the pushers into a reject bin 56, as shown in FIGS. 14A and 14B. Rejecting undestacked packages prevents jamming a narrower downstream discharge conveyor 98, one of whose sides 100 is generally collinear with the vertical wall 44 to receive packages properly registered against the inside of the wall in registration with the aligned side 100 of the discharge conveyor. Otherwise, the undestacked package could jam at the entrance point 102 onto the discharge conveyor 98 at the aligned side 100.

Figure 15A:
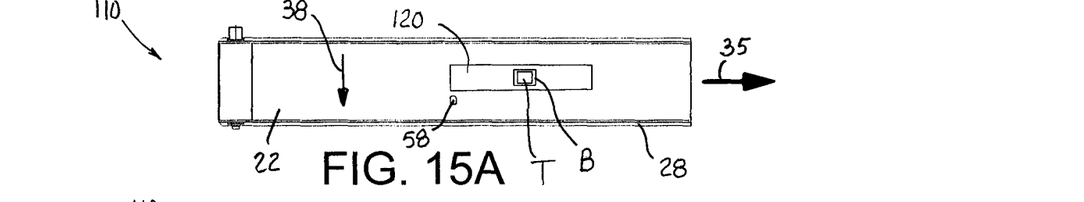
FIGS. 15A and 15B are top plan and side elevation views of another version of a destacking conveyor embodying features of the invention including a force applicator applying a force against the top package in a stack.
Figure 15B:
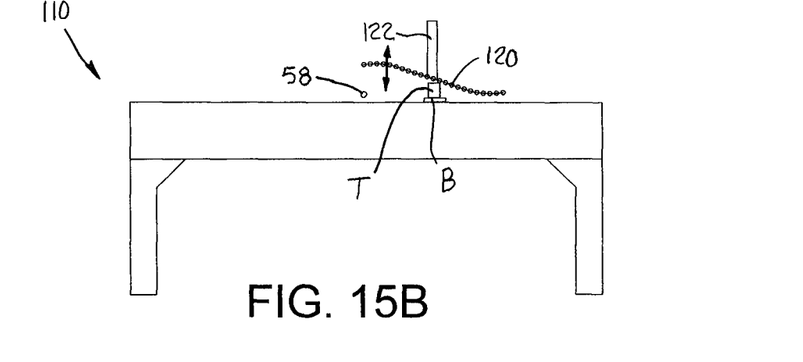
Figure 16A:
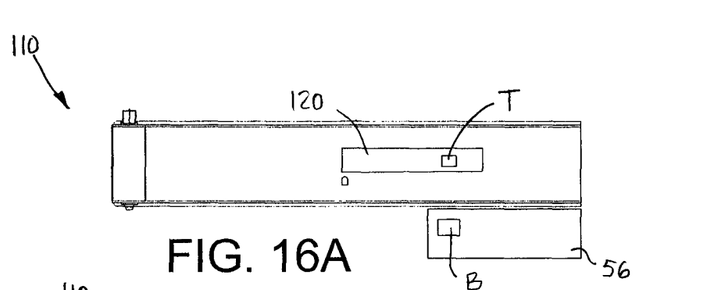
FIGS. 16A and 16B are top plan and side elevation views as in FIGS. 15A and 15B showing the force applicator applying force against the top of a stack.
Figure 16B:
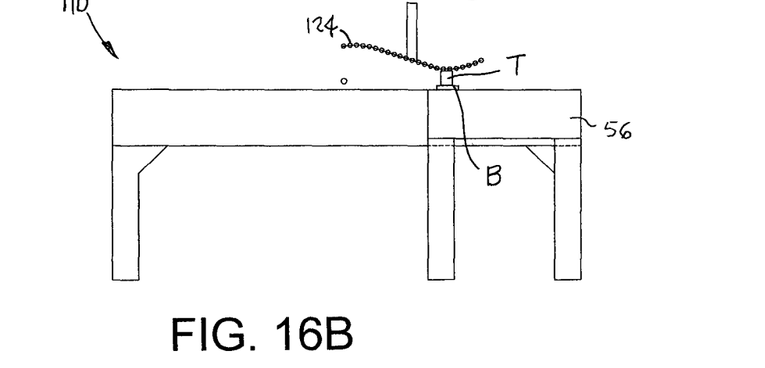

Another version of a destacking conveyor is shown in FIGS. 15A and 15B. The conveyor 110 differs from the versions previously described in that it lacks a vertical wall. Instead the conveyor 110 has a force applicator in the form of an overhead mat 120 that applies a downward force on the top of a package stack. The downward force impedes the forward progress of the stack in the conveying direction 35 while the pushers in the conveyor belt 22 slide the bottom package B from under the top package T in the transverse direction 38 toward the first side 28 of the conveyor 110. Once the package detector 58 detects the passing of a package stack, the mat 120 is lowered by a mat actuator 122 into contact with the top of the top package T of the stack. As shown in FIGS. 16A and 16B, the force of the mat 120 on the stack allows the bottom package B to be pushed by the pushers from under the top package T and off the side 29 of the conveyor 110 into a reject bin 56. The mat 120 may include freely rotatable rollers 124 for lower-friction rolling contact with packages to avoid tipping or scratching the packages.

Figure 17A:
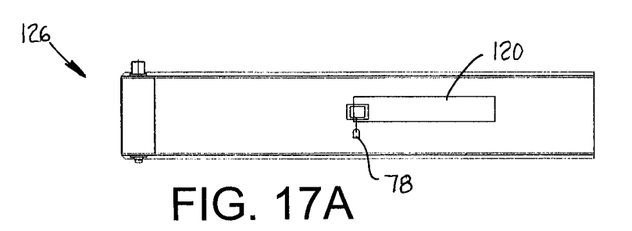
FIGS. 17A and 17B are top plan and side elevation views of a destacking conveyor as in FIGS. 15A and 15B with a vertical array of package detectors.
Figure 17B:
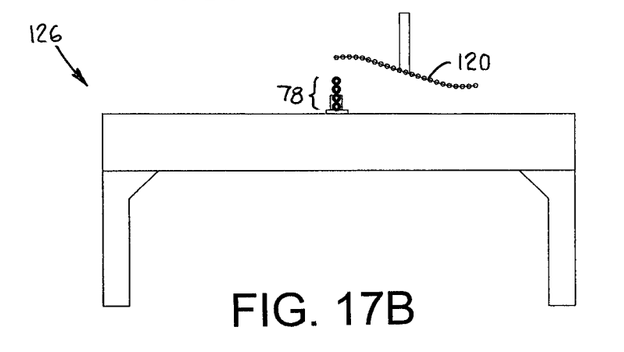

FIGS. 17A and 17B show a conveyor 126, like that of FIGS. 15A and 15B, that instead uses a vertical array 78 of photoelectric sensors as in FIGS. 9-11 as package detectors. Besides detecting the passage of a stack, the array 78 detects the height of the stack. The detected height is used to set the lowered position of the mat 120 appropriate for the particular stack. The mat 120 may be realized as a continuous flexible sheet or a series of articulatable modules joined by hinge pins to help conform the mat to the top of the stack.

Figure 18:
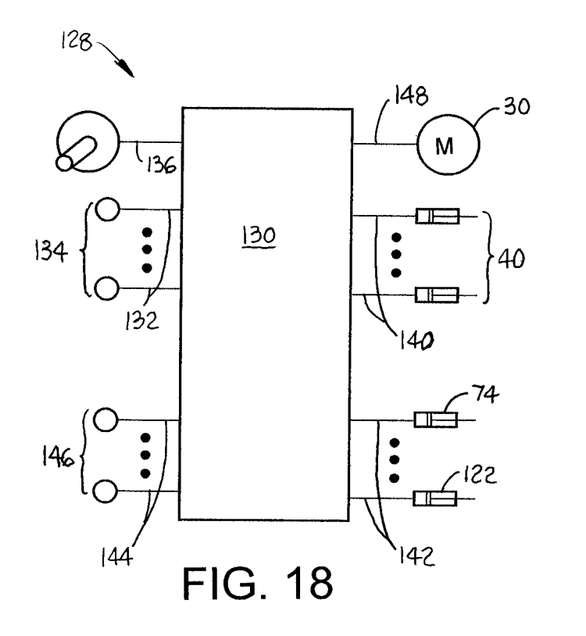
FIG. 18 is a schematic block diagram of a control system for a destacking conveyor as in any of the figures.

A control system for the destacking conveyor is shown in FIG. 18. The control system 128 includes a controller 130, such as a programmable logic controller or other programmable computer with program memory containing instructions that when executed control the operation of the destacking conveyor. The controller 130 receives detector signals 132 from the one or more photo eyes 134 from the particular package detector 58, 78, 88 (FIGS. 4A-16B) being used. The package detector signals 132 may each contain stack height information or may be used together in the computation of the stack height. From the package detector signal or signals 132 indicating packages to be destacked and from a belt speed signal 136 from a belt-speed detector 138, such as a shaft encoder mounted on the belt's driveshaft, the controller 130 computes the length and height of the stack and sends actuation signals 140 to the pusher zone actuators 40 and wall actuation or mat actuation signals 142 to the liftable wall segment actuators 74 or the mat actuator 122, depending on the destacking configuration used. The actuator signals 140 are also used to set the gap width of the adjustable wall segments and the duration and sequencing of the raising of the wall segments and the sequencing of the pusher actuation zones. The controller 130 also receives detector signals 144 from other package detectors 146, such as the detectors 84, 85 in the destacking conveyor of FIG. 11 or the stuck package detectors 92, 93 of FIGS. 13A and 13B. From those signals 144, the controller 130 inhibits the lowering of the liftable wall segments onto an uncleared package and diverts an undestacked package stack to the reject bin. The controller 130 can also control the speed of the belt by a motor speed signal 148 to the motor 30.

Although the invention has been described with reference to a few exemplary versions, other versions are possible. For example, the package detectors were described as photoelectric devices, but other detection devices such as laser range finders, camera visioning systems, or piximity switches, may be used. The various actuators may be realized by robotic arms, pneumatic cylinders, motors and gears, or electromagnetic actuators, for example.

What is claimed is:
1. A destacking conveyor comprising:
a conveyor frame extending in length from an upstream end to a downstream end and laterally between two opposite sides;
a conveyor belt advancing in a conveying direction along a length of the conveyor frame and having pushers for pushing packages in a transverse direction toward one or the other side of the conveyor frame;
a vertical wall having a bottom extending in the conveying direction above the conveyor belt and forming a gap between the conveyor belt and the bottom of the vertical wall;
a series of actuation zones disposed along the length of the conveyor frame and including actuators to selectively actuate the pushers as they advance through the actuation zones;
a package detector disposed upstream of the actuation zones to send a detector signal indicating the passage of a stack of packages to the actuators to sequentially actuate the actuation zones to actuate the pushers as they advance through the actuated actuation zones to push the stack in the transverse direction against the vertical wall as the stack advances in the conveying direction so that the top package of the stack is restrained by the vertical wall as the pushers push the bottom package under the vertical wall through the gap to separate the top and bottom packages as they advance in the conveying direction.

2. A destacking conveyor as in claim 1 wherein the pushers are rollers that rotate when actuated on axes parallel to the conveying direction.

3. A destacking conveyor as in claim 1 wherein the pushers are rollers that rotate when actuated on axes oblique to the conveying direction.

4. A destacking conveyor as in claim 1 wherein the pushers are cross belts that advance across the conveyor belt perpendicular to the conveying direction when actuated.

5. A destacking conveyor as in claim 1 wherein the pushers are shoes that advance across the conveyor belt perpendicular to the conveying direction when actuated.

6. A destacking conveyor as in claim 1 wherein the package detector includes a photoelectric transmitter transmitting a light beam to a photoelectric receiver along a line at a height above the conveyor belt greater than the height of the gap.

7. A destacking conveyor as in claim 1 wherein the package detector includes a vertical array of photoelectric transmitters transmitting light beams to a vertical array of photoelectric receivers along parallel lines to measure the height of a stack of packages.

8. A destacking conveyor as in claim 1 wherein the package detector includes a horizontal array of range finders spaced apart laterally above the conveyor belt to measure the height of a stack of packages.

9. A destacking conveyor as in claim 1 further comprising one or more wall actuators and wherein the vertical wall includes one or more liftable wall segments actuated by the one or more wall actuators.

10. A destacking conveyor as in claim 9 further comprising package detectors disposed on each of the liftable wall segments to detect the presence of a package in the gap and send a detector signal to the wall actuator to prevent the liftable wall segment from lowering onto the package in the gap.

11. A destacking conveyor as in claim 1 further comprising a reject actuation zone, including a reject actuator, downstream of the vertical wall and a pair of package detectors arranged to detect the presence of a package in the gap straddling the downstream end of the vertical wall and send a detector signal to the reject actuator to actuate the reject actuation zone to actuate the pushers passing through the actuation zone to push the package off the side of the conveyor belt.

12. A destacking conveyor comprising:
a conveyor frame extending in length from an upstream end to a downstream end and laterally between two opposite sides;
a conveyor belt advancing in a conveying direction along a length of the conveyor frame and having pushers pushing packages in a transverse direction toward one or the other side of the conveyor frame;
a vertical wall having a liftable segment extending in the conveying direction above the conveyor belt and also having a bottom;
a wall actuator coupled to the liftable segment to raise the liftable segment to a raised position forming a gap between the conveyor belt and the bottom of the liftable segment and to lower the liftable segment to a lowered position closing the gap enough to prevent packages from passing through the gap;
a package detector disposed upstream of the liftable segment to send a detector signal indicating the passage of a stack of packages to the wall actuator to raise the liftable segment to the raised position so that the top package of the stack is restrained by the vertical wall as the pushers push the bottom package under the vertical wall through the gap to separate the top and bottom packages as they advance in the conveying direction.

13. A destacking conveyor as in claim 12 wherein the package detector includes a photoelectric transmitter transmitting a light beam to a photoelectric receiver along a line at a height above the conveyor belt greater than the height of the gap.

14. A destacking conveyor as in claim 12 wherein the package detector includes a vertical array of photoelectric transmitters transmitting light beams to a vertical array of photoelectric receivers along parallel lines to measure the height of a stack of packages.

15. A destacking conveyor as in claim 12 wherein the package detector includes a horizontal array of range finders spaced apart laterally above the conveyor belt to measure the height of a stack of packages.

16. A destacking conveyor as in claim 12 wherein the package detector measures the height of a stack of packages and sends a detector signal to the actuator to lift the wall segment in the raised position so that the gap is lower than the height of the stack.

17. A destacking conveyor as in claim 12 further comprising a plurality of the wall actuators and wherein the vertical wall includes a series of the liftable wall segments actuated by the wall actuators.

18. A destacking conveyor as in claim 17 further comprising package detectors disposed on each of the liftable wall segments to detect the presence of a package in the gap and send a detector signal to the wall actuator to prevent the liftable wall segment from lowering onto the package in the gap.

19. A destacking conveyor as in claim 12 comprising a series of actuation zones disposed along the length of the conveyor frame and including actuators to selectively actuate the pushers to push packages in the transverse direction as they advance through the actuation zones.

20. A destacking conveyor as in claim 19 further comprising a reject actuation zone, including a reject actuator, downstream of the vertical wall and a pair of package detectors arranged to detect the presence of a package in the gap straddling the downstream end of the vertical wall and send a detector signal to the reject actuator to actuate the reject actuation zone to actuate the pushers passing through the actuation zone to push the package off the side of the conveyor belt.

21. A destacking conveyor as in claim 12 further comprising a discharge conveyor at the downstream end of the conveyor frame having a first side aligned with one of the sides of the conveyor frame and a second side aligned with the downstream end of the vertical wall so that packages that pass through the gap are not received by the discharge conveyor.

22. A destacking conveyor as in claim 12 wherein the pushers are constantly actuated along the length of the vertical wall.

* * * * *